United States Patent [19]
Fujioka et al.

[11] Patent Number: 5,333,372
[45] Date of Patent: Aug. 2, 1994

[54] METHOD OF MANUFACTURING A MAGNETIC HEAD

[75] Inventors: Yoshiharu Fujioka, Yamato; Shintaro Nagatsuka; Shoji Tsutaki, both of Yokohama, all of Japan

[73] Assignee: Kabushiki Kaisha Toshiba, Kawasaki, Japan

[21] Appl. No.: 968,399

[22] Filed: Oct. 29, 1992

Related U.S. Application Data

[63] Continuation of Ser. No. 665,763, Mar. 8, 1991, abandoned.

[30] Foreign Application Priority Data

Mar. 15, 1990 [JP] Japan .................................. 02-66250

[51] Int. Cl.⁵ ............................................... G11B 5/42
[52] U.S. Cl. .................................... 29/603; 360/126; 360/127
[58] Field of Search ............... 29/603; 360/125–127, 360/103

[56] References Cited

U.S. PATENT DOCUMENTS 4,894,742 1/1990 Saito et al. .......................... 360/126

FOREIGN PATENT DOCUMENTS 58-83319  5/1983 Japan.
59-24414  2/1984 Japan.

Primary Examiner—Carl E. Hall
Attorney, Agent, or Firm—Cushman, Darby & Cushman

[57] ABSTRACT

A method for manufacturing a magnetic head having a laminated core formed by alternately laminating metal magnetic layers and oxide layers on a non-magnetic substance base to a prescribed thickness. The method includes the steps of, positioning the laminated core in a frame of oxide magnetic substance to form a laminated core block, fusing the laminated core and the frame into one body, cutting the fused body to form a complementary pair of laminated core blocks, forming a groove for coil windings on one of the complementary pair of the laminated core blocks, applying a non-magnetic substance film between the laminated cores of the laminated core blocks to form a magnetic gap, joining the complementary pair of the laminated core blocks together to form a magnetic head block and finishing a surface of the magnetic head block to form a prescribed head surface around the magnetic gap.

6 Claims, 9 Drawing Sheets

METHOD OF MANUFACTURING A MAGNETIC HEAD

This is a continuation of application Ser. No. 07/665,763, filed Mar. 8, 1991, now abandoned.

FIELD OF THE INVENTION

The present invention relates generally to a magnetic head, and more particularly, to a laminated core type magnetic head and a method for manufacturing thereof.

BACKGROUND OF THE INVENTION

In recent years, magnetic recording media having high coercive force as metal tapes and barium-ferrite (Ba-ferrite) tapes, etc. have been developed for magnetic tape recorders/reproducers in response to demands for high density recording. However, such magnetic recording media with such a high coercive force have a relatively small saturation magnetic flux density. If such magnetic recording media are used with a conventional ferrite head, an undesired magnetic saturation occurs in the vicinity of the magnetic gap due to the small saturation magnetic flux density.

To overcome the problem, a head whose magnetic gap is composed of a metal magnetic substance has been adopted. This metal magnetic substance has extremely less specific resistance than conventional Mn-Zn ferrite. Also the practical permeability of the metal magnetic substance is relatively low, in the order of several MHz frequency band, due to the skin effect of eddy-current loss. For those reasons, a laminated core head which obtains the main core by laminating metal magnetic film and non-magnetic film alternately by the thin film forming technology has come to be employed.

Shown in FIG. 1 is a plan showing a conventional laminated core type magnetic head.

The laminated core head 1 is composed of the laminated cores 2 and 3. These laminated cores 2 and 3 are produced by laminating the metal magnetic film 5 and the insulation film (Sio2, Al203) 6 alternately on the non-magnetic insulating plate 4 by the sputtering method or the evaporation method and further, by laminating non-magnetic insulating plate 8 by glass fusing with the glass 7. The metal magnetic film 5 and the insulating film 6 are formed in thickness of the track width (Tw) and construct the magnetic gap section 9. The magnetic gap is left by the sputtering of film 10 which is made of SiO2, etc. in specified thickness and inserted into the magnetic gap between the laminated cores 2 and 3.

The laminated core head 1 is able to generate a more strong recording magnetic field than a ferrite head because it uses the metal magnetic film 5 which has a high flux density and has a satisfactory write capability for such recording media having a high coercive force as metal tape, etc. (coercive force $\geq 1500$ e). Further, as the laminated core head 1 is a laminated structure provided with the insulation layer 6 between the metal magnetic films 5, eddy-current loss by a metal magnetic film having good conductivity is reduced.

However, the laminated core head 1 has a defect in that the recording reproduction efficiency is not good as all magnetic paths are formed in the same width as the recording width (the track width Tw).

As a solution against this defect, a composite head shown in FIG. 2 is considered.

The gapping core 11 and the looping core 12 are formed individually. The gapping core 11 is made of a metal magnetic substance and the looping core 12 is made of such oxide magnetic substance as ferrite having satisfactory high frequency characteristics. Since the gapping core 11 is made of metal magnetic substance, generation of magnetic saturation in the vicinity of the magnetic gap 13 can be prevented and a high recording magnetic field strength is obtainable.

However, it is extremely difficult to get magnetic continuity on the joining surface between the gapping core 11 and the looping core 12. In addition, there was a problem that high manufacturing technology and a number of manufacturing processes were required.

Thus, the conventional magnetic head described above had such problems that in case of the laminated core head, all magnetic paths are formed in the same width as the track width and recording reproduction efficiency is not good and in case of the composite head, no magnetic continuity is obtainable on the joining surface between the gapping core and the looping core.

SUMMARY OF THE INVENTION

It is, therefore, an object of the present invention to provide a magnetic head having a laminated core formed by alternately laminating metal magnetic layers and oxide layers on a non-magnetic substance base to a prescribed thickness and a method for manufacturing the magnetic head. The magnetic head includes a gapping core having a complementary pair of laminated cores each having metal magnetic layers and oxide layers alternately laminated on a non-magnetic substance base to a prescribed thickness, the complementary pair of the laminated cores being spaced a prescribed magnetic gap by a non-magnetic substance film and a looping core for supporting the gapping core so that they form a magnetic loop together, the looping core having a complementary pair of oxide magnetic substance blocks, wherein the gapping core and the looping core have a common flat plane crossing them to each other.

While, the method for manufacturing a magnetic head includes the steps of positioning the laminated core in a frame of oxide magnetic substance to form a laminated core block, fusing the laminated core and the frame into one body, cutting the fused body to form a complementary pair of laminated core blocks, forming a groove for coil windings on one of the complementary pair of the laminated core blocks, applying a non-magnetic substance film between the laminated cores of the laminated core blocks to form a magnetic gap, joining the complementary pair of the laminated core blocks together to form a magnetic head block and finishing a surface of the magnetic head block to form a prescribed head surface around the magnetic gap.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
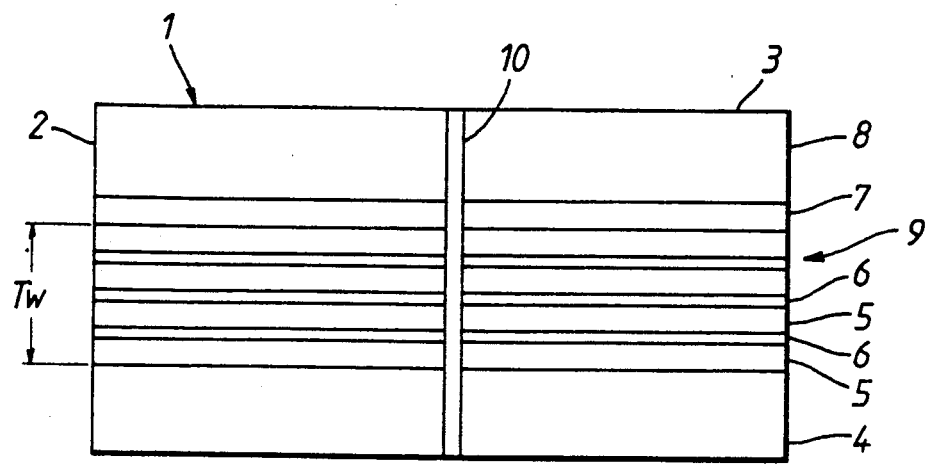
FIG. 1 is a plan showing a conventional laminated core type magnet head.
Figure 2:
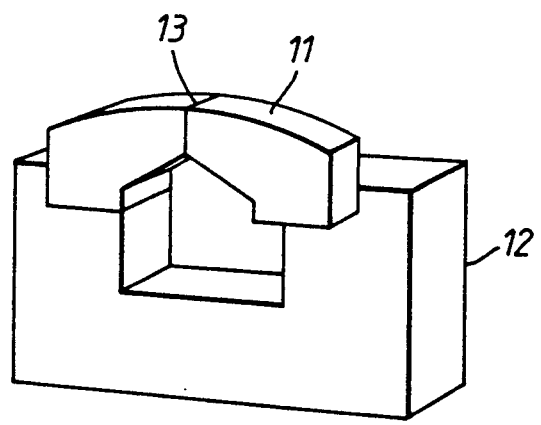
FIG. 2 is an oblique view showing composite heads.

The present invention will be described in detail with reference to the FIGS. 3 through 10. Throughout the drawings, reference numerals or letters used in FIGS. 1 and 2 will be used to designate like or equivalent elements for simplicity of explanation.

Referring now to FIGS. 3(a) through 3(f), a first embodiment of the magnetic head according to the present invention will be described in detail.

Hereinafter, an embodiment of the present invention is explained in detail referring to the drawings. FIGS. 3(a) through 3(f) is a slant view showing an embodiment of the magnetic head manufacturing method involved in the present invention in order to processes.

Figure 3A:
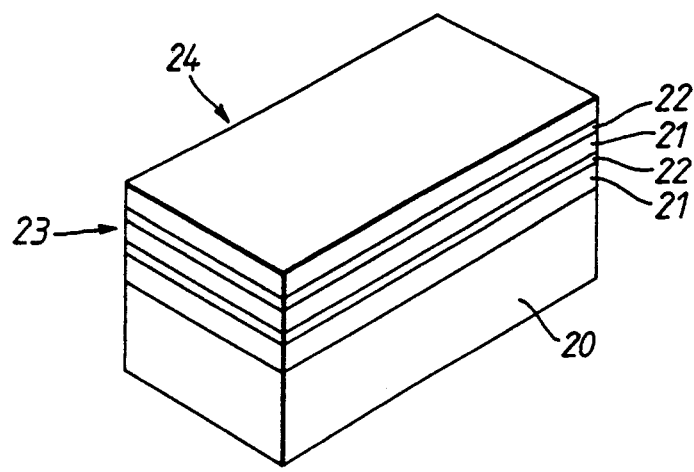
FIGS. 3(a) through 3(f) are oblique views showing one embodiment of the magnetic head manufacturing method involved in the present invention by order of processes.

First, as shown in FIG. 3(a), the metal magnetic substance 21 such as Sendust alloy or Co—Zr—Nb alloy, etc. and the insulation oxide 22 such as SiO2 or Al2O3 are laminated alternately on a non-magnetic substance 20 such as glass or ceramic using the spattering of evaporating thin film forming technology. These metal magnetic substance 21 and oxide substance 22 are laminated until a thickness the same as the track width and the magnetic gap section 23 is formed.

In the same manner, multiple pieces of the laminated core block 24 composed of the non-magnetic substance 20 and the magnetic gap section 23 are formed. Further, for the other laminated core blocks 24, adhesive glass (not shown) is coated on the back side of the non-magnetic substance 20.

Figure 3B:
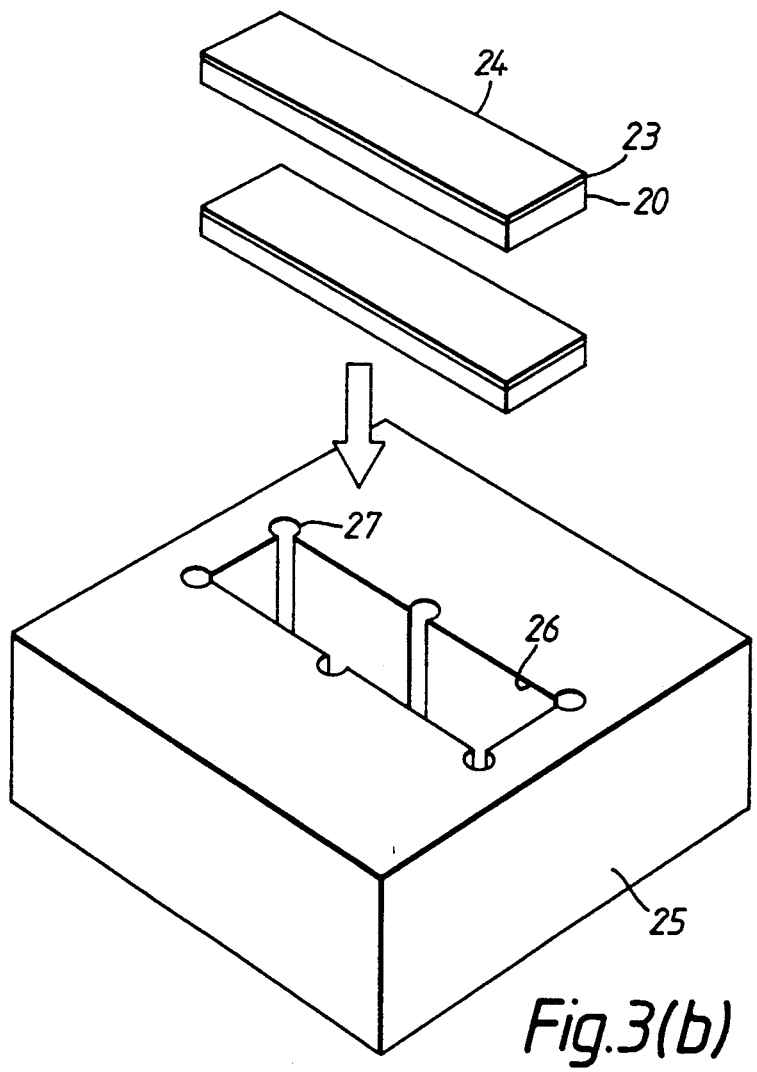

On the other hand, as shown in FIG. 3(b), the laminated core block 24 can be fitted to the oxide substance magnetic block 25 such as ferrite and the framed hole 26 is drilled from the surface to the back. The groove shape connecting section 27 is formed at the corner and part of the wall surface of this hole 26. Multiple laminated core blocks 24 are embedded into this frame hole 26 in such a manner that the magnetic gap section 23 and the non-magnetic substance 20 of the adjacent laminated core block 24 are accumulated alternately in the laminated direction of the non-magnetic substance 20 and the magnetic gap section 23, that is, the vertical direction.

When the laminated core blocks 24 are embedded in the frame hole 26, the laminated core blocks 24 are accurately positioned against the oxide magnetic block 25 to get magnetic continuity.

Figure 3C:
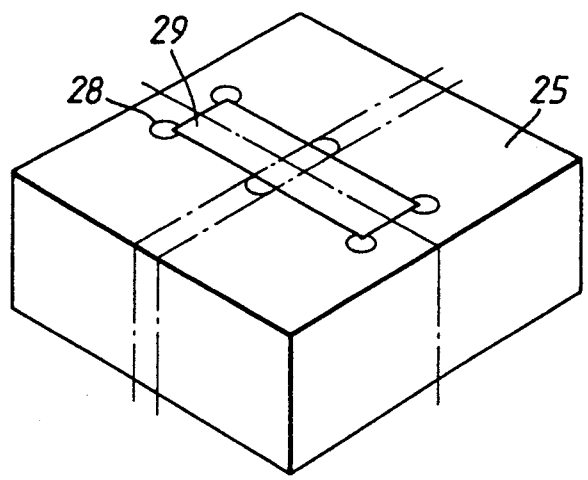

Thus, multiple laminated core blocks 24 are successively laminated in the frame hole 26. Then, as shown in FIG. 3(c), low melting point glass 28 is filled in the connecting section 27 and heated to fuse. The laminated core blocks 24 are joined to each other by the adhesive glass of the non-magnetic substance 20 when it is fused and the laminated core block 29 is formed.

Further, the laminated core block 29 and the oxide magnetic substance block 25 are united into one body by the low melting point glass of the connecting section 27 when it is fused. Then, this united block is cut at the cutting surface shown by the one-dotted chain line in FIG. 3(c) to get the laminated core block 30.

Figure 3D:
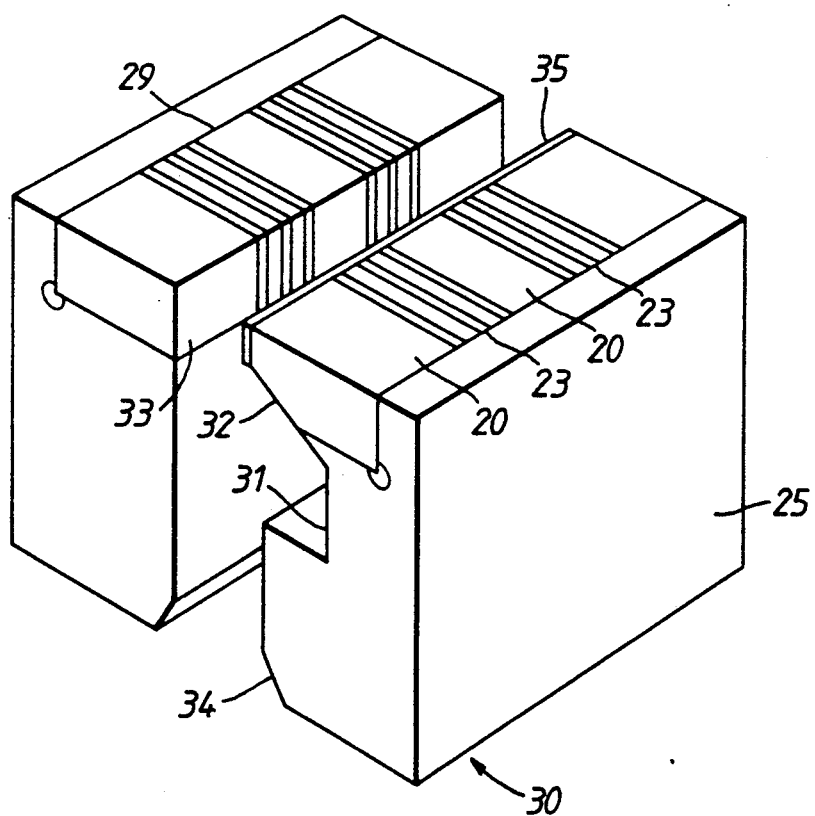

Then, the joining surfaces (the cut surface shown in FIG. 3(c)) when the laminated core blocks 30 are to be joined are mirror machined by such a method as lapping, polishing, etc. Further, as shown in FIG. 3(d), the magnetic paths are formed and the winding groove 31 to wind a winding is formed in the direction of the track width on the joining surface of the laminated core block 30.

This winding groove 31 is formed by partially cutting the laminated core block 29 by the edge section 32 in the vicinity of the boarder of the laminated core block 29 and the oxide magnetic substance block 25.

The magnetic gap forming surface 33 is formed by the surface of the mirror machined laminated block 29. Further, the glass groove 34 for glass fusing is formed on the lower end of the joining surface of the laminated core block 30. Then, the non-magnetic film 35 made of SiO2, etc. is formed until the thickness is the same as the magnetic gap length on the magnetic gap forming surface 33 of the laminated core block 30 on which the winding groove 31 is formed by such a method as spattering, etc.

Figure 3E:
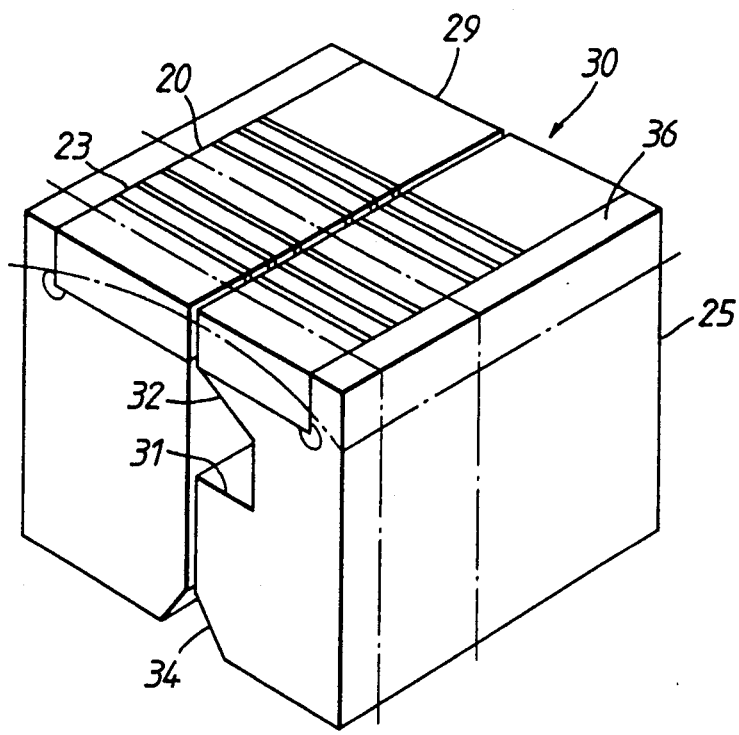

Then, as shown in FIG. 3(e), the joining surfaces of the laminated core blocks and that without the winding groove formed are opposed, joined and pressurized and further, the edge section 32 of the winding groove 31 and the glass groove are united into one body by filling low melting point glass, heated and fused.

Figure 3F:
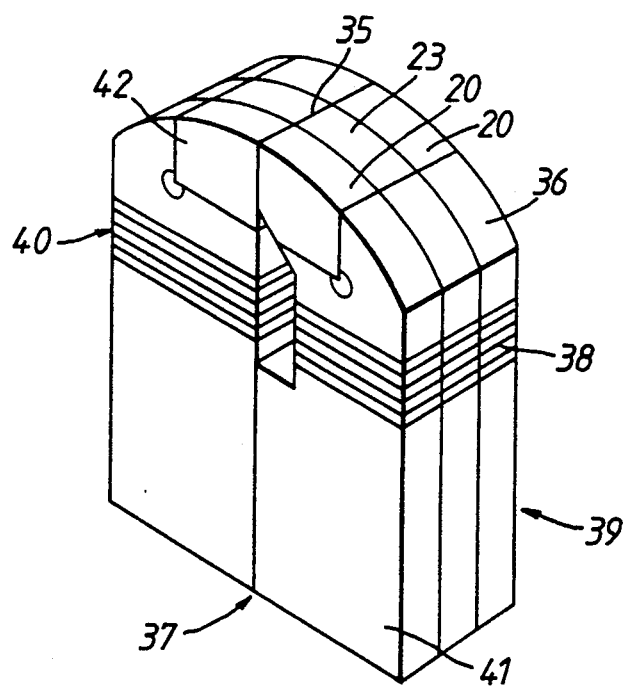

Then, as shown by the one-dotted chain line in FIG. 3(e), the sliding surface 36 is formed in the curved shape and cut at the cutting surface shown by the double-dotted chain line to get the magnetic head 37 shown in FIG. 3(f). Lastly, the winding 38 is wound in the winding groove 31.

The magnetic head 37 thus manufactured is in such structure that the laminated cores 39 and 40 are joined through the magnetic gap of the non-magnetic film 35 as shown in FIG. 3(f). The laminated cores 39 and 40 are composed of the oxide magnetic substance core 41 and the gapping core 42. The gapping core 42 is in the laminated structure that the magnetic gap section 23 which is obtained by laminating the metal magnetic substance 21 and the oxide 22 until the thickness of track width (Tw) is jammed between the non-magnetic substances 20.

Because of this construction, eddy current loss is low in a broad frequency band and a sufficient recording magnetic field can be generated, enabling high density recording. Further, the looping core 41 is formed by oxide magnetic substance and a broader magnetic path can be formed ranging over the whole area in the direction of the track width of the laminated cores 39 and 40, and the recording reproduction efficiency is extremely high.

Further, in the cutting process shown in FIG. 3(c), the length of the gapping core 42 in the tape running direction on the sliding surface 36 is set up properly to prevent a tape from running on the boarder in the sliding surface 36 of the gapping core 42 and the looping core 41. Thus, a satisfactory reproduction characteristic can be obtained by reducing generation of false gaps.

According to the magnetic head manufacturing method involved in this embodiment, the laminated core block 29 is formed by laminating the laminated core blocks 24 composed of the magnetic gap section 23 and non-magnetic substance 20 in the frame hole 26, the laminated core blocks 30 is formed by uniting the laminated core block 29 and the oxide magnetic substance block 25, and the laminated cores 39 and 40 are obtained by processing the thus obtained laminated core block 30.

The laminated core block 30 is processed using such processes as mirror process, groove process, glass fusing and curve surface process. Thus, a laminated core having many uniform characteristics can be manufactured easily and cheaply in a short period.

Further, as the laminated core block 24 and the oxide magnetic substance block 25 are united into one body by embedding the laminated core block 24 into the frame hole 26, the positions of the gapping core 42 and the looping core 41 which are formed by the laminated core block 24 and the oxide magnetic substance block 25, respectively can be accurately controlled and magnetically satisfactory continuity is obtained.

Figure 4A:
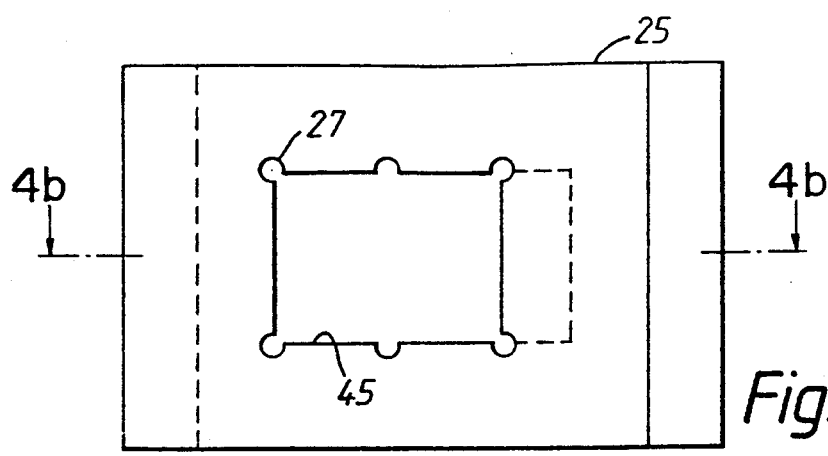
FIGS. 4(a) and 4(b) show the magnetic head manufacturing method involved in another embodiment of the present invention.
Figure 4B:
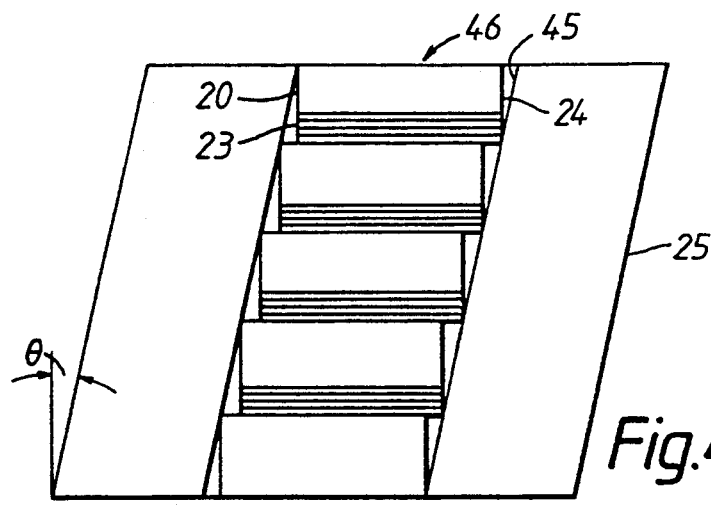

FIGS. 4(a) and 4(b) show the magnetic head manufacturing method involved in another embodiment of the present invention. FIG. 4(a) shows a plan of the oxide magnetic substance block 25, FIG. 4(b) shows a cross-sectional view of the oxide magnetic substance block 25 cut at the line A—A' shown in FIG. 4(a). This embodiment makes the azimuth recording possible.

First, the formation of the laminated core block 24 is the same as the embodiment shown in FIGS. 3(a) through 3(f). In this embodiment, the frame hole 45 tilted by azimuth angle is provided on the oxide magnetic substance block 25 as shown in FIGS. 4(a) and 4(b). The laminated core blocks 24 are successively laminated in this frame hole 45.

In this case, as shown in FIG. 4(b), the upper and lower laminated core blocks 24 are arranged by shifting them by conforming to the inclination of the frame hole 45. Then, low melting point glass is filled into the connecting section 27, heated and fused to form the laminated core block 46 and at the same time, the laminated core block 46 and the oxide magnetic substance block 25 are united into one body.

Then, according to the inclination of the frame hole 45, the thus combined laminated core block 46 and the oxide magnetic block 35 are cut to get the laminated core blocks. Subsequent processes are the same as those in the embodiment shown in FIGS. 3(a) through 3(f).

In this embodiment, the magnetic gap forming surface is formed aslant to the tape running direction by a specified angle and the azimuth recording is possible.

Other operations and effects are the same as those shown in the embodiment in FIGS. 3(a) through 3(f).

Figure 5:
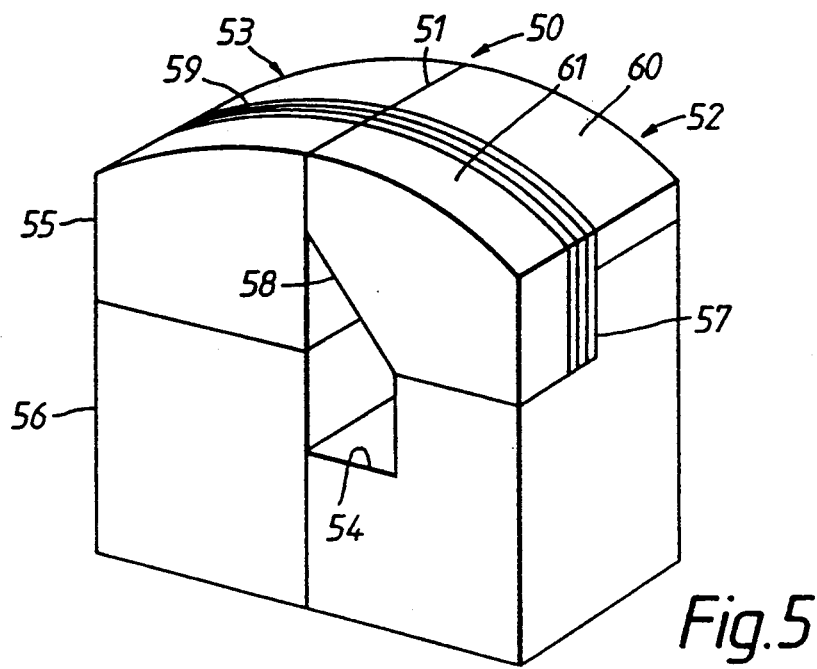
FIG. 5 is an oblique view of the magnetic head involved in another embodiment of the present invention.

Shown in FIG. 5 is an oblique view of the magnetic head involved in another embodiment of the present invention.

The magnetic head 50 is in such structure that the laminated cores 52 and 53 are joined through the magnetic gap 51 which is formed by non-magnetic film. The laminated core 52 has the winding groove 54 formed. The laminated cores 52 and 53 have the gapping core 55 formed on the upper sliding surface and the looping core 56 at the lower side. The looping core 56 has the stepped section 57 at the upper part. The gapping core 55 is formed in the laminated structure that the magnetic gap section 59 which is obtained by laminating the metal magnetic substance and oxide in the thickness of the track width (Tw) is jammed between the non-magnetic substances 60 and 61.

Further, the magnetic gap section 59 is cut off by the edge section 58 of the winding groove 54 in the vicinity of the joining surfaces of the laminated cores 52 and 53. The non-magnetic substance 60 is formed in thin thickness and provided at the upper part of the upper end side of the stepped section 57.

Further, the non-magnetic substance 61 and the magnetic gap section 59 are thick and provided at the upper part of the lower end side of the stepped section 57. One side of the magnetic gap section 59 is press fitted to the wall surface of the stepped section 59 and is united in a body with the looping core 56. Further, a winding not shown is wound in the winding groove 54.

From the thus constructed magnetic head, the same effect as that from the magnetic head shown in FIG. 3(f) is obtainable. That is, as the gapping core 55 is of laminated type, eddy current loss is low in wide frequency bands and a sufficient recording magnetic field can be produced to a magnetic recording medium having a high coercive force, making high density recording possible. Further, as the greater part of the magnetic paths is formed by the wide core 56, recording production efficiency is high. In addition, generation of the false gap is reduced and a satisfactory reproduction characteristic is obtainable.

In the embodiment shown in FIGS. 3(a) through 3(f), the magnetic gap section 23 is connected to the looping core 41 in the same width as the track width. On the other hand, in this embodiment the magnetic gap section 59 is press fitted to the wall surface of the wider stepped section 57 united in a body with the looping core 56. Therefore, the magnetic head involved in this embodiment is excellent in the magnetic continuity on the joined surface and extremely high recording reproduction efficiency can be obtained.

Figure 6A:
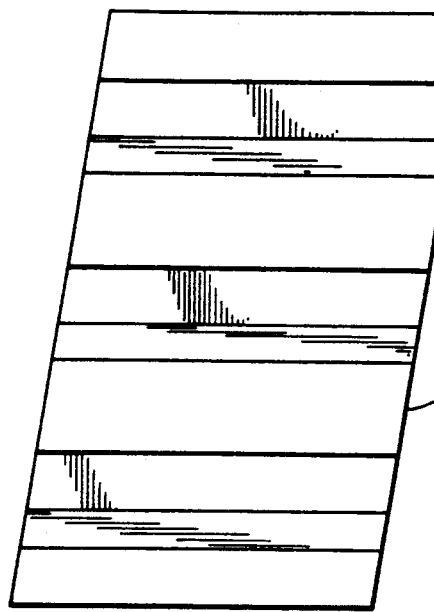
FIGS. 6(a) and 6(b) show the manufacturing method of the magnetic head involved in another embodiment of the present invention.
Figure 7:
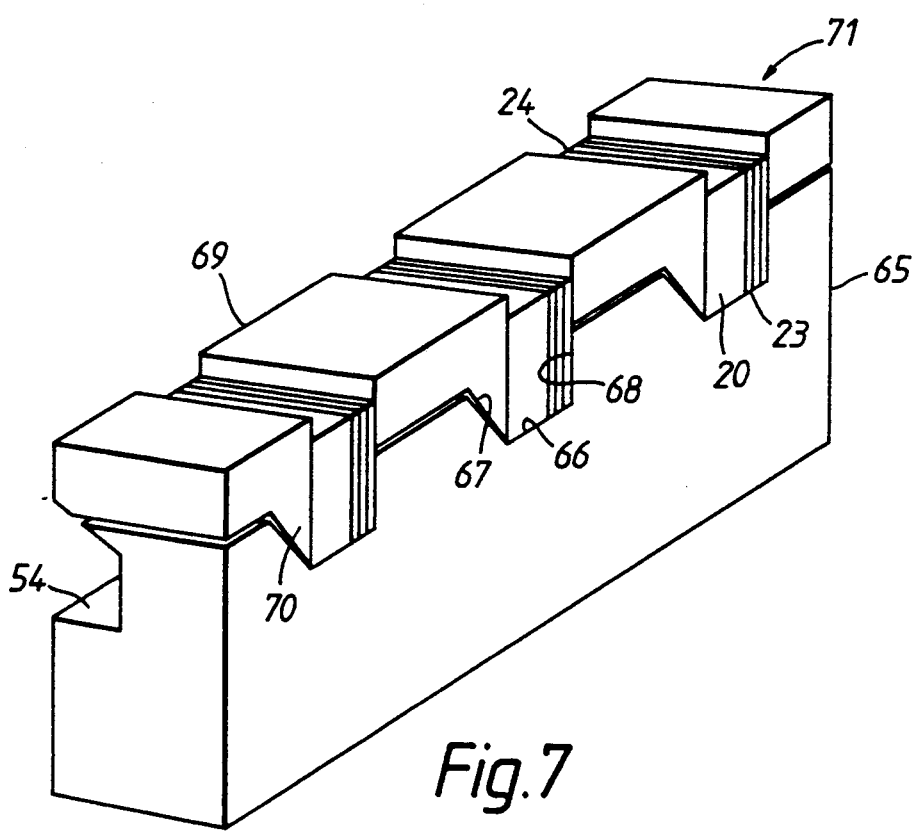
FIG. 7 is an oblique view for explaining the assemble of the oxide magnetic substance block with the laminated core block.
Figure 8:
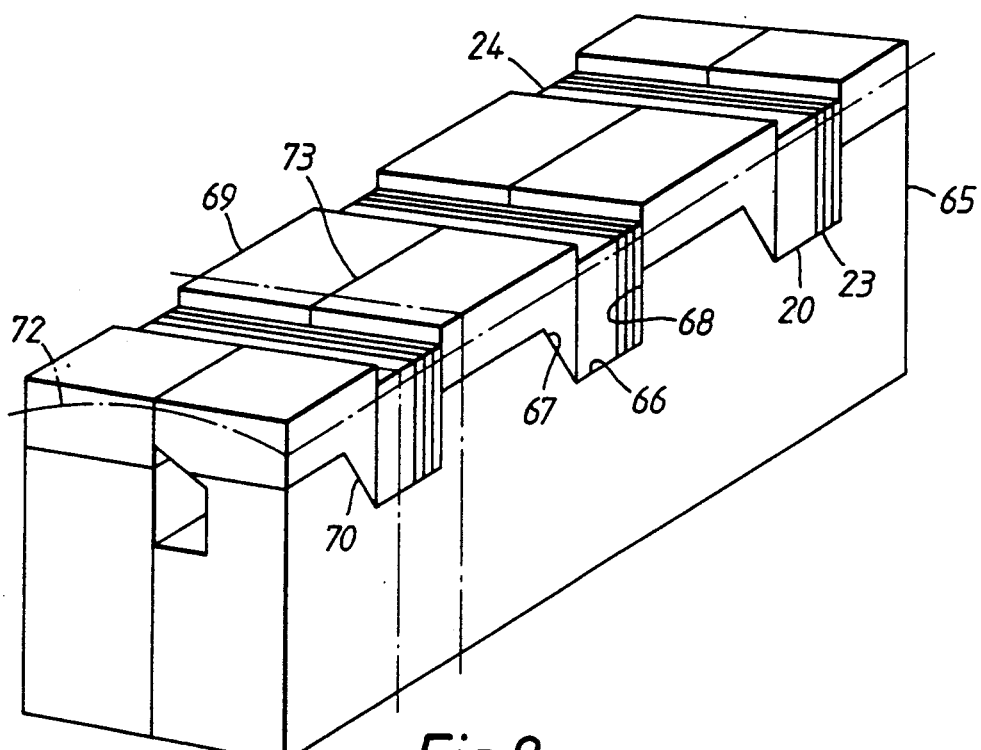
FIG. 8 shows an oblique view for explaining the joining and cutting processes of the laminated core block.
Figure 9:
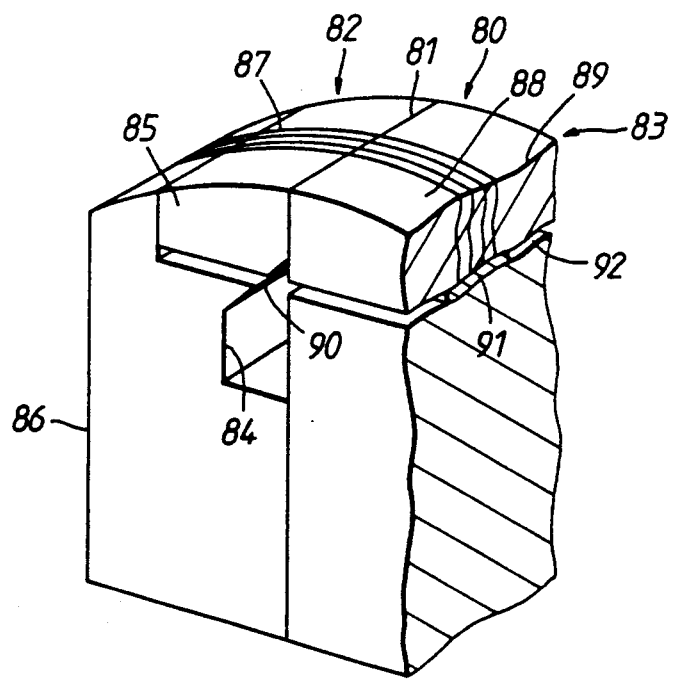
FIG. 9 is an oblique view showing the magnetic head involved in another embodiment of the present invention by partically breaking it.

FIGS. 8 through 10 show the magnetic head manufacturing method involved in another embodiment of the present invention. FIG. 6(a) shows its side view. Further, FIG. 7 is an oblique view for explaining the assemble of the oxide magnetic substance block and the laminated core block, and FIG. 8 shows an oblique view for explaining the joining and cutting processes of the laminated core block. According to the manufacturing method shown in this embodiment, the magnetic head shown in FIG. 3 can be manufactured.

First, the construction of the laminated core block 24 by forming the magnetic gap section 23 composing of the metal magnetic substance 21 and the oxide 22 on the non-magnetic substance 20 is the same as the embodiment shown in FIGS. 3(a) through 3(f).

Figure 6B:
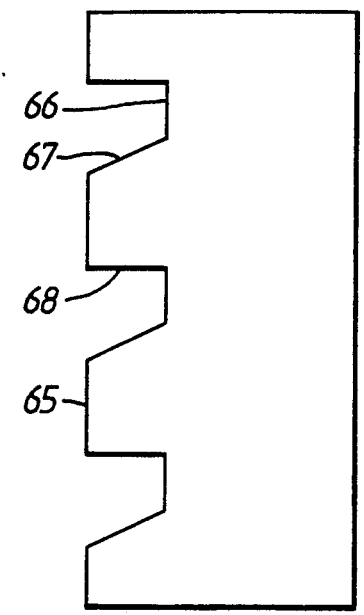

In this embodiment, two opposite parallel surfaces of the oxide magnetic substance block 36 are tilted by the specified angle in the direction of the track width by considering an azimuth angle as shown in FIG. 6(a). On the surface of this oxide magnetic substance block 65, multiple grooves 66 are formed parallelly in the tape running direction as shown in FIGS. 6(a) and 6(b). In this case, the taper 67 is formed on one of the walls of the groove 66. Further, the wall of the stepped section 57 shown in FIG. 5 is formed by the wall 68 opposite to the taper 67 of the groove 66.

Then, the laminated core blocks 24 are arranged in the grooves 66 of the oxide magnetic substance block 65 in such a way that the laminating directions of the non-magnetic substance 20 and the magnetic gap section 23 agree with the direction of the track width and the magnetic gap section 23 is brought to contact with the wall 68. Then, pressing this non-magnetic substance 69 from the top, push the non-magnetic substance 20 in the direction of the track width by the outer end surface of the wedge 70 and the magnetic gap section 23 is press fitted to the wall surface 68 to unite it with the oxide magnetic substance block 65. Thus, the laminated core block 71 is formed, the joining surfaces are mirror processed and at the same time, the winding groove 54 is formed.

Then, the laminated core block 71 with the winding groove 54 formed is joined to the laminated core block 71 without the winding groove 54 formed through the non-magnetic film 73 as shown in FIG. 8. Then, the sliding surface 72 is curved as shown by the one-dotted chain line in FIG. 8 and is cut at the cutting surface shown by the double-dotted chain line. Thus, the magnetic head 50 consisting of the laminated cores 52 and 53 are obtained (see FIG. 5).

According to the magnetic head manufacturing method described above, a large number of magnetic heads having uniform characteristics can be efficiently and easily manufactured as in the embodiment shown in FIGS. 3(a) through 3(f).

Further, the magnetic gap section 23 and the oxide magnetic substance block 65 can be tightly fitted together by the taper 67 provided in the groove 66 of the oxide magnetic substance block 65 and the wedge 70 provided at the end of the non-magnetic substance 69. That is, as described above, the magnetic gap section 59 and the wall surface of the stepped section 57 of the magnetic head 50 are strongly fitted to each other and magnetically satisfactory continuity is obtained.

Shown in FIG. 9 is an oblique view showing the part of the magnetic head involved in another embodiment of this invention by breaking it.

The magnetic head 80 is in such structure that the laminated cores 82 and 83 are joined together through the magnetic gap 81 which is made of non-magnetic film. The laminated core 82 is provided with the winding groove 84. The gapping core 85 is formed on the sliding surface at the upper parts of the laminated cores 82 and 83 and the looping cores 86 are formed at the lower parts.

The gapping core 85 is in the laminated construction where the magnetic gap section 87 which is obtained by laminating metal magnetic substances and oxides in thickness of the track width (Tw) is jammed between the non-magnetic substances 88 and 89. Further, the gapping core 85 is cut off by the edge 90 of the winding groove 84 in the vicinity of the joining surfaces of the laminated cores 82 and 83.

In this embodiment, the high permeability magnetic substance 91 which is wider than the lamination width (the track width) of the magnetic gap section 87 is provided between the magnetic gap section 87 and the looping core 86 in the state where it is closely fitted to the magnetic gap section 87 and the looping core 86.

Further, between other gap 85 and the looping core 86 without the high permeability magnetic substance 91 provided, the glass 92 is filled to fuse the gapping core 85 and the looping core 86. Further, a winding which is not shown is wound in the winding groove 84.

In the embodiment of the magnetic head in the construction as described above, the same effect as in the embodiment shown in FIGS. 3(a) through 3(f) can be obtained. That is, as the gapping core 85 is in laminated structure, eddy current loss is low in a wide frequency band and a sufficient recording magnetic field can be produced to a magnetic recording medium having a high coercive force, making high density recording possible.

Further, as the greater part of the magnetic paths is formed by the wide core 86, recording production efficiency is high. In addition, generation of the false gap is reduced and a satisfactory reproduction characteristic is obtainable.

Further, as the magnetic gap section 87 is united to the looping core 86 in a body through the high permeable magnetic substance 91 which is wider than the lamination width of the magnetic gap section 87, it is excellent in the magnetic continuity on this joining surface and a high recording reproduction characteristic can be obtained. In addition, the gapping core 85 and the looping core 86 are fused by the glass 92 and extremely high adhesive strength is obtained.

Figure 10A:
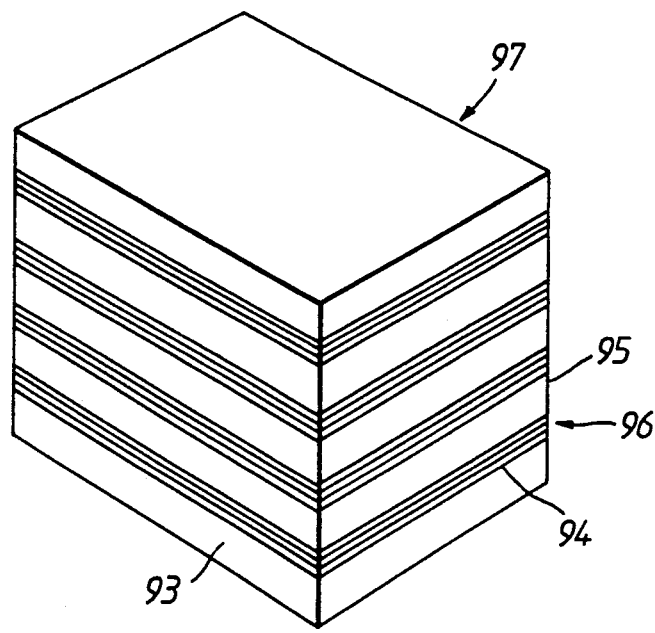
FIGS. 10(a) through 10(c) are oblique views showing the magnetic head manufacturing method involved in another embodiment of the present invention in order of processes.
Figure 10B:
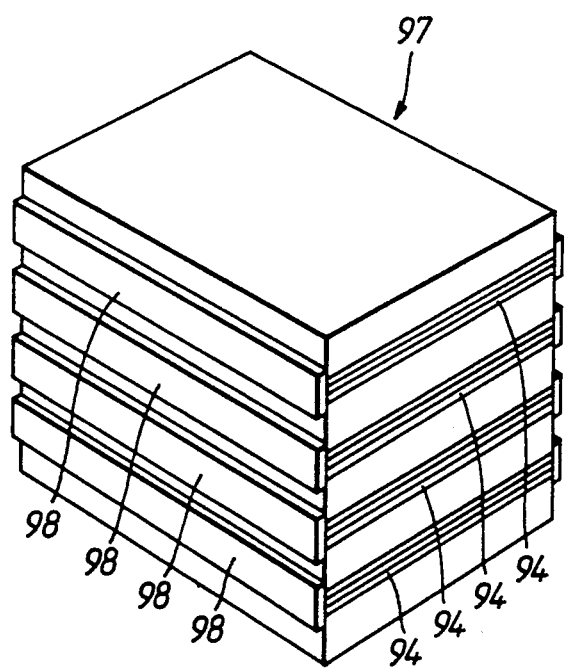
Figure 10C:
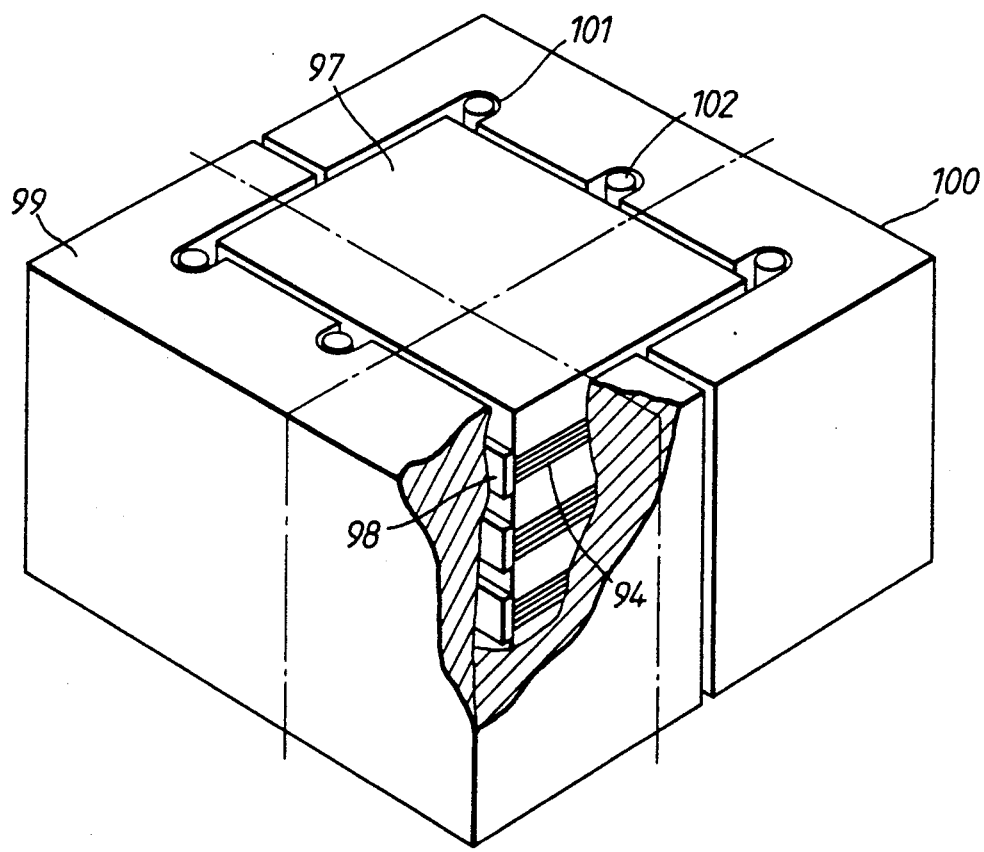

FIGS. 10(a) through 10(c) are an oblique view showing the magnetic head manufacturing method involved in another embodiment of this inventory in order of processes. Further, the partially broken magnetic head is shown in FIG. 10(c). According to this embodiment, the magnetic head shown in FIG. 9 can be manufactured.

First, as shown in FIG. 10(a), the magnetic gap section 94 is formed in the same width as the track width by alternately laminating metal magnetic substances and oxides on the non-magnetic substance 93. Then, the non-magnetic substance 95 is laminated on the magnetic gap section 94 by glass fusing, etc. By repeating the laminating process of the magnetic gap section and the non-magnetic substance on the non-magnetic substance 95, the laminated core block 97 is formed by successively laminating the laminated cores 96 composing of the non-magnetic substances 93 and 95 and the magnetic gap section 94.

Then, two opposing surfaces of the laminated core block 97 are shaped by such a method as lapping, etc, and smoothed by removing forced cut glass, etc. Then, as shown in FIG. 10(b), the high permeable magnetic substance 98 which is wider than the lamination width (the track width) of the magnetic gap section 94 is arranged in stripes on the side of the magnetic gap section 94 on the smoothed two surfaces.

On the other hand, as shown in FIG. 10(c), the oxide magnetic substance blocks 99 and 100 are formed in a U-shape. The laminated core block 97 is put between these oxide magnetic substance blocks 99 and 100 from the side of the high permeable magnetic substance 98.

Further, on the oxide magnetic substance blocks 99 and 100, the groove shape connecting section 101 is formed for filling adhesive glass into the corners and part of the wall surfaces opposing to the laminated core block 97. Then, the oxide magnetic substance blocks 99 and 100 are pressed at a specified pressure in the direction of the high permeable magnetic substance 98 forming surface and heated with the glass 102 filled in the connecting section 101 to unite the oxide magnetic substance blocks 99 and 100 and the laminated core block 97 into a body by glass fusing. Then, it is cut on the cutting surface shown by the one-dotted chain line in FIG. 10(c) to get the laminated core blocks.

Subsequent processes are the same as those shown in FIGS. 3(d) through 3(f). The magnetic head 80 consisting of the laminated cores 82 and 83 shown in FIG. 9 is thus obtained.

According to the magnetic head manufacturing method involved in this embodiment, the same effect as that shown in the embodiment in FIGS. 3(a) through 3(f) can be obtained and at the same time, the oxide magnetic substance blocks 99 and 100 are pressed at a specified pressure in the assembling process of the oxide magnetic substance blocks 99 and 100 and the laminated core block 97, a strong adhesive force is obtained.

Further, as the fused glass enters into the clearance between the high permeable magnetic substances 98, adhesive strength of the oxide magnetic substance blocks 99 and 100 with the laminated core block 97 is high. That is, as described above, on the magnetic head 80, the magnetic continuity between the gapping core 85 and the looping core 86 is satisfactory and a high recording reproduction characteristic is obtained.

As described above, the magnetic continuity between the gapping core which is of laminated type and the looping core which is composed of oxide magnetic substance is satisfactory. This invention has such effects that the recording characteristic and reproduction characteristic are extremely high and according to claim 1, 3 and 5, this invention has an effect that the magnetic head involved in this invention can be efficiently and easily manufactured.

As described above, the present invention can provide an extremely preferable magnetic head.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A method for manufacturing a magnetic head having a laminated core formed by alternately laminating metal magnetic layers and oxide layers on a non-magnetic substance base to a prescribed thickness, comprising the steps of:
    positioning the laminated core in a frame of oxide magnetic substance to form a laminated core block;
    fusing the laminated core and the frame into one body;
    cutting the fused body to form a complementary pair of laminated core blocks;
    forming a groove for coil windings on one of the complementary pair of the laminated core blocks;
    applying a non-magnetic substance film between the laminated cores of the laminated core blocks to form a magnetic gap;
    joining the complementary pair of the laminated core blocks together to form a magnetic head block; and
    finishing a surface of the magnetic head block to form a prescribed head surface around the magnetic gap.

2. A method of claim 1, wherein multiple pieces of the laminated core are accumulated in the frame at the positioning step, and the method further comprising a step of separating the finished magnetic head block into multiple pieces of magnetic heads.

3. A method for manufacturing a magnetic head having a laminated core formed by alternately laminating metal magnetic layers and oxide layers on a first non-magnetic substance base to a prescribed thickness, comprising:
    positioning at least a piece of the laminated core in a tapered groove of an oxide magnetic substance block to form a laminated core block;
    applying a non-magnetic substance wedge in the groove for anchoring the laminated core in the groove;
    fusing the laminated core, the non-magnetic substance wedge and the oxide magnetic substance block into one body;
    cutting the fused body to form a complementary pair of laminated core blocks;
    forming a groove for coil windings on one of the complementary pair of the laminated core blocks;
    applying a non-magnetic substance film between the laminated cores of the laminated core blocks to form a magnetic gap;
    joining the complementary pair of the laminated core blocks together to form a magnetic head block; and
    finishing a surface of the assembled block to form a prescribed head surface around the magnetic gap.

4. A method of claim 3, wherein plural tapered grooves are provided on the oxide magnetic substance block, and multiple pieces of the laminated core are individually positioned in each groove at the positioning step, and the method further comprising a step of separating the finished magnetic head block into multiple pieces of magnetic heads.

5. A method for manufacturing a magnetic head having a laminated core formed by alternately laminating metal magnetic layers and oxide layers on a non-magnetic substance base to a prescribed thickness, comprising the steps of:
    applying a pair of magnetic plates onto corresponding edges of the laminated core;
    positioning the assembly of the laminated core and the magnetic plates in a frame of oxide magnetic substance to form a laminated core block;
    fusing the assembly of the laminated core and the magnetic plates and the frame into one body;
    cutting the fused body to form a complementary pair of laminated core blocks;
    forming a groove for coil windings on one of the complementary pair of the laminated core blocks;
    applying a non-magnetic substance film between the laminated cores of the laminated core blocks to form a magnetic gap;

joining the complementary pair of the laminated core blocks together to form a magnetic head block; and finishing a surface of the magnetic head block to form a prescribed head surface around the magnetic gap.

6. A method of claim 5, wherein multiple assemblies of the laminated core and the magnetic plates are accumulated in the frame at the positioning step, and the method further comprising a step of separating the finished magnetic head block into multiple pieces of magnetic heads.

* * * * *